F. W. FRENCH.
DEMOUNTABLE WHEEL CONSTRUCTION.
APPLICATION FILED AUG. 7, 1917.
1,297,673.
Patented Mar. 18, 1919.
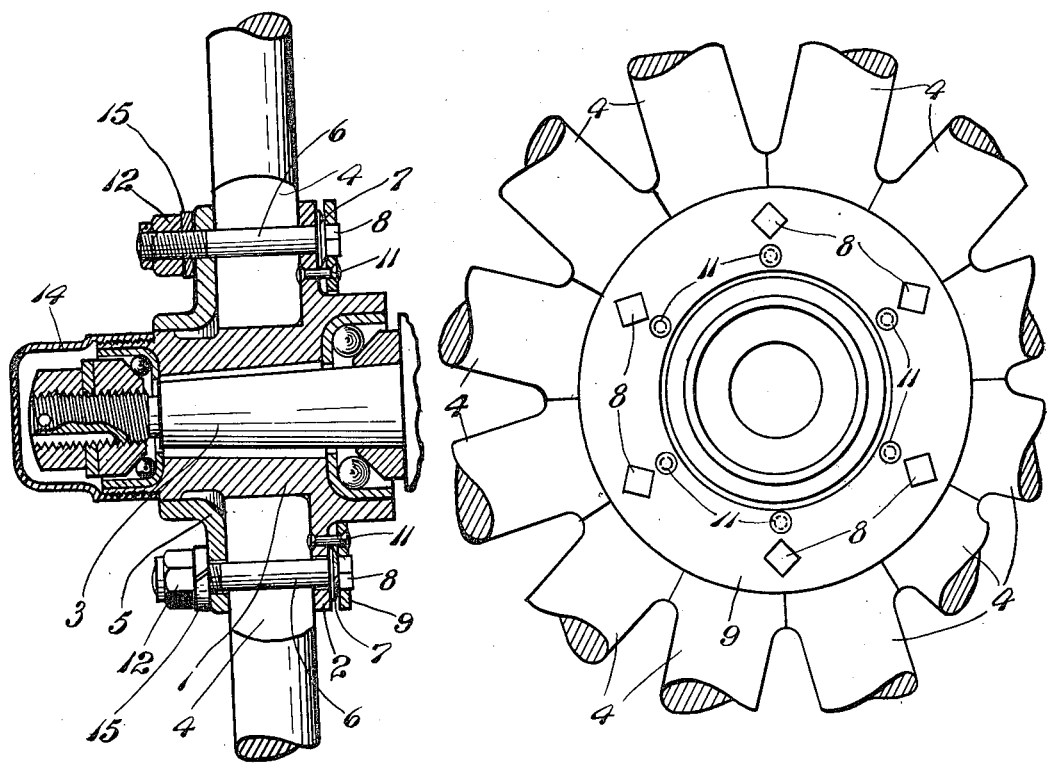
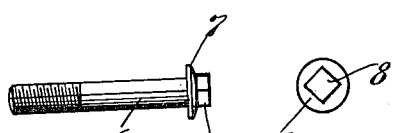
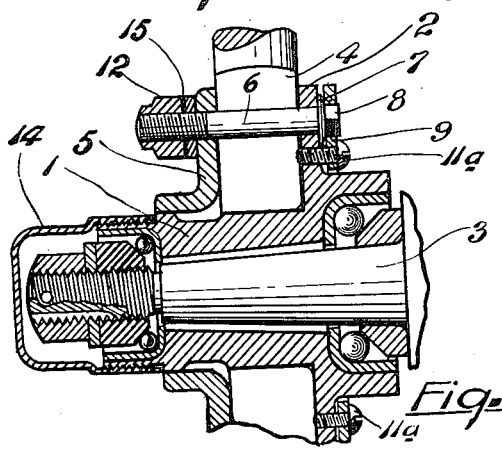
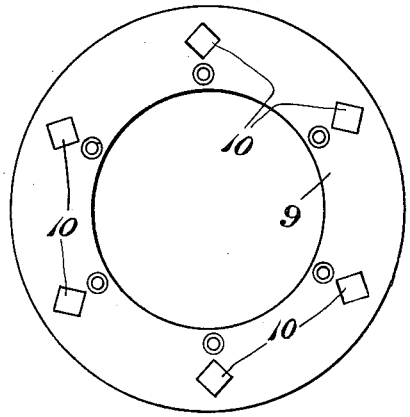
Inventor
Fred W. French
By Moulton & Lawrence
Attorneys.

UNITED STATES PATENT OFFICE.

FRED W. FRENCH, OF GRANDVILLE, MICHIGAN.

DEMOUNTABLE-WHEEL CONSTRUCTION.

1,297,673.  Specification of Letters Patent.  Patented Mar. 18, 1919.

Application filed August 7, 1917. Serial No. 184,839.

*To all whom it may concern:*

Be it known that I, FRED W. FRENCH, a citizen of the United States of America, residing at Grandville, in the county of Kent and State of Michigan, have invented certain new and useful Improvements in Demountable-Wheel Constructions; and I do hereby declare the following to be a full, clear, and exact description of the invention, such as will enable others skilled in the art to which it appertains to make and use the same.

This invention relates to a demountable wheel construction particularly applicable to wheels of motor vehicles. It is the object and purpose of the present invention to simplify the construction and make it particularly effective in operation whereby a wheel may be readily detached from the hub and as readily mounted thereon, all of which together with many other features of novelty and utility will appear from the following description of a preferred embodiment of the invention, reference being had to the accompanying drawing showing the same in which, Figure 1 is a vertical section through a wheel hub having my invention applied thereto.

Fig. 2 is a side elevation thereof.

Fig. 3 is an elevation of a ring retainer adapted to be permanently attached to the wheel hub flange and serving to hold the connecting bolts substantially rigid with respect to the flange.

Figs. 4 and 5 are side and end views, respectively, of a preferred form of connecting bolt used in my invention and, Fig. 6 is a fragmentary sectional view like that shown in Fig. 1, with a slight modification in detail.

In the drawing like reference characters refer to like parts.

In the construction shown, the hub 1 is provided with an outwardly extending annular flange 2. In the illustration, this hub is rotatably mounted upon the axle 3 this being the construction for front wheels in motor vehicles, as is well known. Said hubs in the rear wheels of motor vehicles are keyed or otherwise permanently secured to the rear axle. The wheel includes a plurality of radial spokes 4 which are adapted to be placed over the hub 1, the inner sides of the inner ends of the spokes bearing against said flange 2. After thus being located a second outer flange 5 is passed over the hub and against the opposite sides of the spokes the rigid connection of the wheel and flanges being attained by means of connecting bolts which will now be described.

The body portions of bolts 6 are of usual cylindrical cross section and threaded at one end. At the opposite end each is fashioned with a collar 7 of greater diameter than the bolt. There is also a squared head 8 at the extreme end of the bolt in alinement with the main body portion of said bolt. In practice a plurality of these bolts are inserted through the rear flange 2 between the inner ends of the spokes 4 and through the flange 5, the collar 7 contacting against the outer face of the flange 2. Any desired number of bolts may be used.

A ring of sheet metal 9 is formed with a plurality of squared openings 10 of a size adapted to receive a squared head 8 of a bolt. This ring has a central circular opening sufficient to pass the hub as shown in Figs. 1 and 6, and is placed closely adjacent the flange 2 its openings 10 receiving the heads 8 of the bolts. Any suitable connection may be used for securing said ring 11 to the flange. Preferably rivets 11, as shown in Fig. 1, will be used though, as shown in Fig. 6, screws 11ª may pass through the ring and thread into the flange 2. The number of rivets or screws used is in no way an essential feature of the invention. The threaded ends of the bolts passing through the outer flange 5 are adapted to receive nuts 12. Between said nuts and the outer side of the flange 5, suitable lock nut washers 15 may be inserted. The usual hub cap 14 is used, threading on to the end of the hub.

This construction, it will be observed, permits the ready removability of the nuts 12 and washers 15 after which the wheel may be taken from the hub passing over the cap 14. In practice the outer flange 5 is secured to the wheel by screws or other suitable fastening devices. The bolts 6 left are held against movement and project at right angles from the inner face of the flange 2 facilitating the ready positioning of a wheel again on the hub. The association of the squared ends 8 of the bolts with the ring 9 and the insertion of said heads through similar openings in the ring holds the bolts against turning and the interposition of a collar such as 7 between the ring and the hub flange precludes any endwise movement of the bolts. Also, the bolts are held practically rigid and there is no chance or tendency for them to wabble and position themselves at varying angles with respect to the flange thereby hindering the placing of wheel over the hub.

With this construction no particular type of hole need be made through the flanges 2 and 5 for the passage of the bolt; merely drilling the holes will be sufficient. The ring may be stamped from metal and the openings 10 to receive the heads of the bolts formed at the same time. When the nuts 12 are tightened a very firm and rigid connection is made, but one in which the nuts can be readily removed for changing the wheel at any time.

The invention, as illustrated, shows its application to the front hubs of motor vehicles, but it is to be understood that it is equally applicable to the rear hubs of motor vehicles wheels which ordinarily are provided with brake drums. The only modification required is that ring 9 be placed along side and within the brake drum rather than alongside the hub flange. The brake drum in practice lies alongside the rear inner hub flange and is adapted to be connected thereto by the bolts which pass through both the drum and flanges and between the wheel spokes.

I claim:—

1. In combination, a wheel hub, an annular flange on the hub, a wheel on the hub, the inner ends of the spokes thereof bearing against said flange, a plurality of bolts passed through said flange and wheel, a collar on each bolt bearing against the outer side of the flange, a head to each bolt extending from said collar, a ring, means permanently securing the same to the flange, said ring being provided with a plurality of openings to receive the heads of the bolts, said heads on the bolts and openings in the ring being formed so as to preclude rotative movement of the bolts with respect to the ring, a second flange located against the opposite side of the wheel, said bolts passing therethrough, and nuts on the outer ends of the bolts to bind said hub, wheel and second flange firmly but detachably together.

2. In combination, a wheel hub, an outwardly extending flange thereon, a wheel on the hub, the inner ends of the spokes thereof bearing against the inner side of the flange, a plurality of bolts passed through said flange and wheel, a collar on each bolt bearing against the outer side of the flange, a head on each bolt, means secured to the flange and engaging with the heads of said bolts to hold the same from endwise, rotative or angular movements with respect to the flange, a second flange located against the opposite side of the wheel, said bolts passing therethrough, and means detachably connecting to the ends of the bolts to bind said flanges and wheel firmly but detachably together.

3. In combination, a wheel hub, an outwardly extending flange thereon, a plurality of bolts passed through the flange, said bolts paralleling the hub, a collar on each bolt bearing against the outer side of the flange, a head on each bolt adjacent the collar, and means attached to the flange and engaging with the heads of the bolts to hold the same from endwise, rotative or angular movements with respect to the flange.

4. A construction as claimed in claim 3 in which said means attached to the flange comprises a ring of sheet metal provided with a plurality of openings, one for each bolt, in which the heads of the bolts enter, the collars on the bolts being disposed between the flange and ring, substantially as described.

In testimony whereof I affix my signature.

FRED W. FRENCH.